(12) United States Patent
Wang et al.

(10) Patent No.: US 12,261,834 B2
(45) Date of Patent: *Mar. 25, 2025

(54) AUTOMATIC SIGN-IN UPON ACCOUNT SIGNUP

(71) Applicant: Oracle International Corporation, Redwood Shores, CA (US)

(72) Inventors: Chuang Wang, Issaquah, WA (US); Girish Nagaraja, Sammamish, WA (US); Ghazanfar Ahmed, Redmond, WA (US); Divya Jain, Bothell, WA (US); Weisong Lin, Redmond, WA (US); Zheng Guo, Seattle, WA (US); Roberto Anthony Franco, Seattle, WA (US); Philip Kevin Newman, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,902

(22) Filed: Dec. 18, 2023

(65) Prior Publication Data
US 2024/0121233 A1    Apr. 11, 2024

Related U.S. Application Data

(63) Continuation of application No. 17/463,493, filed on Aug. 31, 2021, now Pat. No. 11,895,106.
(Continued)

(51) Int. Cl.
*H04L 9/40*    (2022.01)
*H04L 67/306*  (2022.01)

(52) U.S. Cl.
CPC ...... *H04L 63/0815* (2013.01); *H04L 63/0807* (2013.01); *H04L 63/0892* (2013.01); *H04L 67/306* (2013.01)

(58) Field of Classification Search
CPC ............. H04L 63/0815; H04L 63/0807; H04L 63/0892
See application file for complete search history.

(56) References Cited

U.S. PATENT DOCUMENTS 8,589,442 B2   11/2013   Wu et al.
8,707,409 B2    4/2014   Shah et al.
(Continued)

FOREIGN PATENT DOCUMENTS

EP       2336886 A2       6/2011
KR    20000058925 A      10/2000
(Continued)

OTHER PUBLICATIONS

"Configure SAML Single Sign-on for Chrome Devices", Google Chrome Enterprise Help, Available Online at: https://support.google.com/chrome/a/answer/6060880?hl=en, Accessed from Internet on Feb. 4, 2021, pp. 1-2.
(Continued)

*Primary Examiner* — William S Powers
(74) *Attorney, Agent, or Firm* — Kilpatrick Townsend & Stockton LLP

(57) ABSTRACT

The present embodiments relate to systems and methods for automatic sign in upon account signup. Particularly, the present embodiments can utilize a federated login approach for automatic sign in upon account signup for a cloud infrastructure. Specifically, the signup and sign in service (also known as SOUP) and an identity provider portal can be configured such that the nodes are aware of each other as Security Assertion Markup Language (SAML) partners. After new account registration, the signup service can redirect the user browser to a cloud infrastructure console to start with a federated login flow, where a sign in service can issue a SAML authentication request, and redirects it to signup service. Responsive to validating the browser using a SAML
(Continued)

authentication process, the browser can be automatically signed into the new account and allowed access the account relating to the cloud infrastructure service.

20 Claims, 9 Drawing Sheets

Related U.S. Application Data

(60) Provisional application No. 63/142,828, filed on Jan. 28, 2021.

(56) References Cited

U.S. PATENT DOCUMENTS

| | | | |
|---|---|---|---|
| 9,043,886 B2 | 5/2015 | Srinivasan et al. | |
| 9,560,036 B2 | 1/2017 | Hinton et al. | |
| 9,774,581 B2 | 9/2017 | Leicher et al. | |
| 10,049,349 B1* | 8/2018 | Grassadonia | G06Q 20/40 |
| 10,287,180 B1* | 5/2019 | Kurani | C02F 1/66 |
| 11,784,995 B1* | 10/2023 | Slowiak | H04L 63/0807 726/9 |
| 2010/0293029 A1* | 11/2010 | Olliphant | G06Q 10/1095 705/7.19 |
| 2012/0072979 A1* | 3/2012 | Cha | H04W 12/069 726/8 |
| 2012/0239560 A1* | 9/2012 | Pourfallah | G06Q 20/102 705/40 |
| 2013/0086670 A1 | 4/2013 | Vangpat et al. | |
| 2013/0104202 A1* | 4/2013 | Yin | G06F 21/42 726/5 |
| 2017/0295165 A1 | 10/2017 | Cicchitto et al. | |
| 2020/0034518 A1* | 1/2020 | Mezzalira | G06F 8/64 |

FOREIGN PATENT DOCUMENTS

| | | |
|---|---|---|
| WO | 2013165274 A2 | 11/2013 |
| WO | 2017084569 A1 | 5/2017 |

OTHER PUBLICATIONS

"How to Configure Automatic Login to Web Portals", Broadcom, Available Online at: https://techdocs.broadcom.com/us/en/symantec-security-software/identity-securityhow-to-configure-automatic-login-to-web-portals.html, Sep. 15, 2020, pp. 1-4.
"Identity Federation in AWS", Amazon, Available Online at: https://aws.amazon.com/identity/federation/, Accessed from Internet on Feb. 4, 2021, pp. 1-3.
"Spring Security—Auto Login User After Registration", Baeldung, Available Online at: https://www.baeldung.com/spring-security-auto-login-user-after-registration, Jun. 28, 2020, 5 pages.
"TIBCO Cloud Federated Authentication", TIBCO Cloud, Available Online at: https://account.cloud.tibco.com/cloud/docs/accounts/manageldap/, Accessed from Internet on Jan. 29, 2021, pp. 1-4.
"What is Self-Service Sign-up for Azure Active Directory?", Microsoft, Available Online at: https://docs.microsoft.com/en-us/azure/active-directory/enterprise-users/directory-self-service-signup, Dec. 2, 2020, pp. 1-4.
U.S. Appl. No. 17/463,493, "Notice of Allowance", mailed Nov. 29, 2023, 9 pages.
FOSTER , "Automatic Post-Registration Sign-in with Identity Server", Available Online at: https://benfoster.io/blog/identity-server-post-registration-sign-in/, Sep. 3, 2016, pp. 1-9.
GENNARO , "How to Set Up a Registration Redirect in WordPress", WPForms, Available Online at: https://wpforms.com/how-to-set-up-wordpress-registration-redirects-complete-guide/, Dec. 3, 2020, pp. 1-16.

* cited by examiner

AUTOMATIC SIGN-IN UPON ACCOUNT SIGNUP

CROSS-REFERENCES TO RELATED APPLICATIONS

The present application is a continuation of U.S. application Ser. No. 17/463,493, filed Aug. 31, 2021, entitled "AUTOMATIC SIGN-IN UPON ACCOUNT SIGNUP," which claims the benefit and priority under 35 U.S.C. § 119(e) to U.S. Provisional Application No. 63/142,828, filed Jan. 28, 2021, entitled "SIMPLE AND SECURE AUTO SIGNIN UPON ACCOUNT SIGNUP," the entire contents of which are incorporated herein by reference for all purposes.

BACKGROUND

Users, via user devices, generally create an account with a service provider to utilize services provided by the service provider. For example, to log into a cloud computing provider, the user may first generate an account associated with the cloud computing provider and then log into the cloud computing provider to gain access to services provided by the cloud computing provider.

In many instances, the account generation (or sign-up) process may be executed by a different computer than a computer performing the sign in process. This can result in a multi-step process of first establishing a new account with a first computer and then providing login credentials to a second computer to log into the second computer.

SUMMARY

Figure 1:
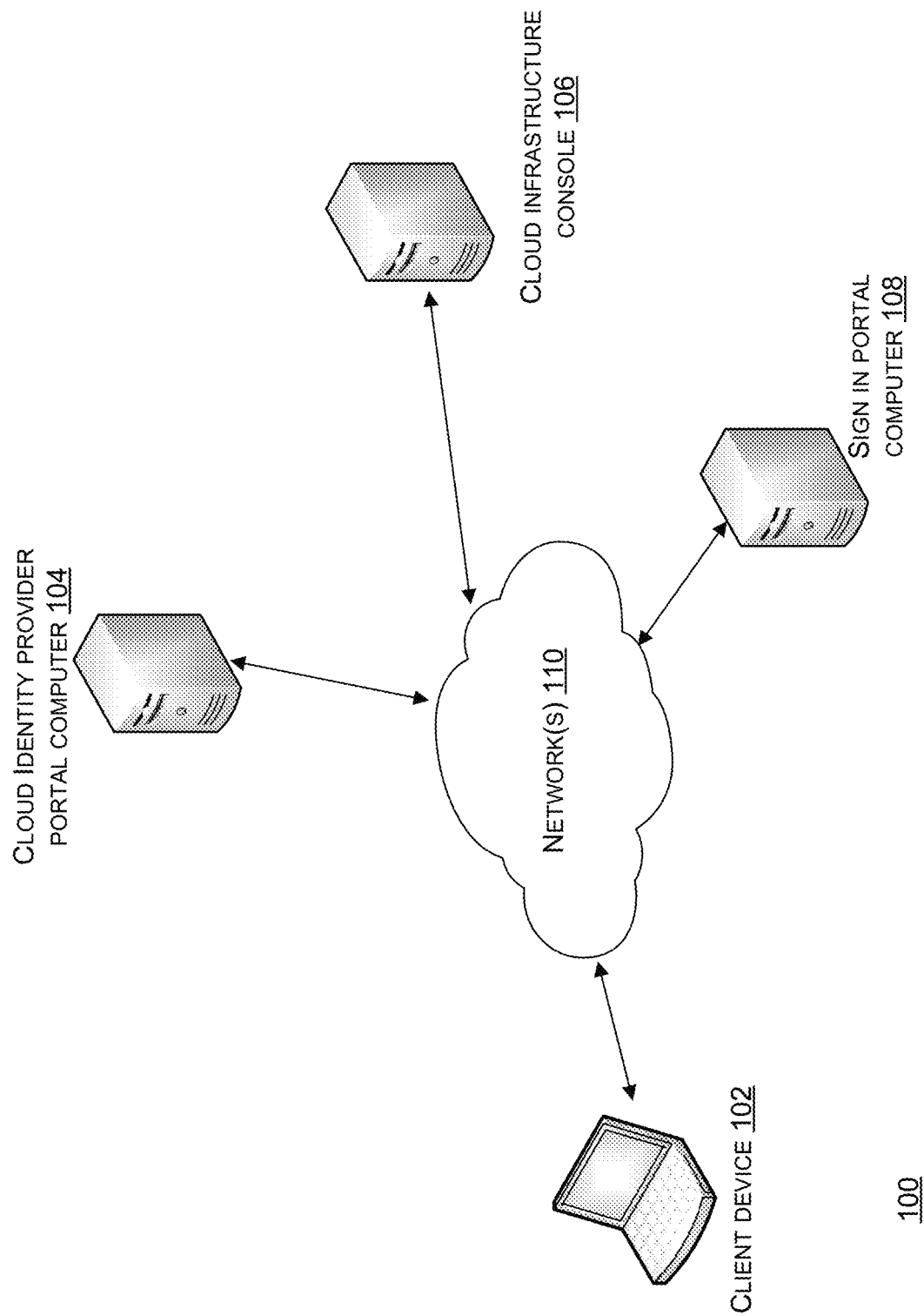
FIG. 1 is a block diagram illustrating a system for an automatic sign in upon account signup process, according to at least one embodiment.

The present embodiments relate to systems, computer-readable mediums, and methods for automatic sign in upon account signup. In a first embodiment, a method performed by a client web browser to securely access both an identity provider portal and a cloud infrastructure console during a single interaction is provided. The method can include obtaining a sign-up request, the sign-up request requesting to sign up a new account to the cloud infrastructure console. The method can also include forwarding the sign-up request to a cloud identity provider portal computer configured to generate the new account.

The method can also include receiving, from the cloud identity provider portal computer, a first redirect message identifying the cloud infrastructure console. The method can also include forwarding the first redirect message to the cloud infrastructure console. The method can also include receiving, by the cloud infrastructure console, a second redirect message identifying the sign in portal. The receiving the second redirect message can be performed responsive to determining that the new account is not authenticated. The method can also include forwarding the second redirect message to the sign in portal.

The method can also include receiving, by the sign in portal, an authentication request message. The method can also include forwarding the authentication request message to the cloud identity provider portal computer configured to authenticate the new account using data included in the sign-up request. The method can also include receiving, by the cloud identity provider portal computer, an authentication response message indicating the authentication of the new account. The method can also include forwarding the authentication response message to the sign in portal. The method can also include receiving, from the sign in portal, a security token and an identity token. The method can also include providing the security token and the identity token to the cloud infrastructure console. The method can also include receiving a Secure Password Authentication (SPA) message from the cloud infrastructure console. The method can also include accessing a secure page at both the cloud identity provider portal computer and the cloud infrastructure console.

Another embodiment relates to a client computer. The client computer can include a processor and a non-transitory computer-readable medium. The non-transitory computer-readable medium can include instructions that, when executed by the processor, cause the processor to obtain a sign-up request to sign up a new account to a cloud infrastructure console. The instructions can further cause the processor to forward the sign-up request to a cloud identity provider portal computer configured to generate the new account. The instructions can further cause the processor to receive, from the cloud identity provider portal computer, a first redirect message identifying a cloud infrastructure console. The instructions can further cause the processor to forward the first redirect message to the cloud infrastructure console.

The instructions can further cause the processor to receive, by the cloud infrastructure console, a second redirect message identifying the sign in portal. The receiving the second redirect message can be performed responsive to determining that the new account is not authenticated. The instructions can further cause the processor to forward the second redirect message to the sign in portal. The instructions can further cause the processor to perform an authentication procedure with the cloud identity provider portal computer and the sign in portal to authenticate the new account. The instructions can further cause the processor to, responsive to authentication of the new account, receive, from the sign in portal, a security token and an identity token. The instructions can further cause the processor to provide the security token and the identity token to the cloud infrastructure console. The instructions can further cause the processor to receive a Secure Password Authentication (SPA) message from the cloud infrastructure console. The instructions can further cause the processor to access a secure page at both the cloud identity provider portal computer and the cloud infrastructure console.

Another embodiment provides a non-transitory computer-readable medium including stored thereon a sequence of instructions which, when executed by a processor causes the processor to execute a process. The process can include forwarding a sign-up request requesting to sign up a new account to a cloud identity provider portal computer configured to generate the new account. The process can also include receiving, from the cloud identity provider portal computer, a first redirect message identifying the cloud infrastructure console. The process can also include forwarding the first redirect message to the cloud infrastructure console. The process can also include receiving, by the cloud infrastructure console, a second redirect message identifying the sign in portal. The receiving the second redirect message can be performed responsive to determining that the new account is not authenticated. The process can also include forwarding the second redirect message to the sign in portal.

The process can also include receiving, by the sign in portal, an authentication request message. The process can also include forwarding the authentication request message to the cloud identity provider portal computer configured to authenticate the new account using data included in the sign-up request. The process can also include receiving, by the cloud identity provider portal computer, an authentication response message indicating the authentication of the new account. The process can also include forwarding the authentication response message to the sign in portal. The process can also include receiving, from the sign in portal, a security token and an identity token. The process can also include providing the security token and the identity token to the cloud infrastructure console. The process can also include receiving a Secure Password Authentication (SPA) message from the cloud infrastructure console. The process can also include accessing a secure page at both the cloud identity provider portal computer and the cloud infrastructure console.

DETAILED DESCRIPTION

In many instances, a client can sign up to a service to enable access to specific services. For example, to access a cloud computing portal, a client can create an account for the cloud computing portal and log into the portal to access the portal. Creation of accounts can allow access to specific portions of data and allow for customization of settings related to each account.

Generally, signing up and signing into a platform comprises a multi-step process. For example, a client first creates an account for a portal and the client then logs into the portal using credentials created in the account. Further, in many instances, the sign in process can be performed by a third-party computer (e.g., an identity portal computer). Responsive creation of an account, the third-party computer can forward the new account details to the portal computer for generation of the new account at the portal. This may require the user to subsequently be redirected to the portal computer and provide login credentials to sign into the portal. However, such a multi-step process can lower user experience.

Further, when users generate an account for a service, they are generally not automatically signed in to that service. Instead, users may need to explicitly submit their username/password, which they just configured at the sign up phase, at a login page that is separate from the sign up page. At a cloud infrastructure (CI) sign in page, there may be two options: federated login vs native login, which can be confusing for first time users. In some instances, a more intuitive sign in instruction can be provided and, as a result, users may only have one option to login when a single sign on (SSO) is still under configuration. However, this still may not sign in users to a CI console automatically.

Further, in an account signup flow, a user can obtain a username/password to register a new account. Upon the new account registration, it can be a desired user experience to sign in the user automatically into the system. This becomes a challenging problem when account signup and sign in are two different services in a distributed system since the sign in service does not have signup session context.

In many instances, a user can sign up in a Cloud Portal and provides their credentials (e.g., email, tenancy name, and password). After successful sign-up, the Cloud Portal can redirect the user to a CI console. Since the user is not authenticated, a console can redirect to a sign in portal (or "SOUP"). The SOUP can ask for the end user for an email (or tenancy name) and password, and authenticates the user. A problem in this process can be that there is no way for Cloud Portal to safely pass the user's credentials directly to SOUP. If there was a way to pass credentials to SOUP, an attacker can harvest user credentials and automatically pass the credentials along to the SOUP to elevate privilege in a victim user account.

To address the problems stated herein, the present embodiments relate to use of a federated login approach in CI. Specifically, the sign in service can be configured beforehand such that they aware each other as Security Assertion Markup Language (SAML) partners. After new account registration, the signup service can redirect the user browser to CI console to start with a federated login flow, where a sign in service can issue a SAML authentication request, and redirects it to signup service.

By leveraging cookie and session management techniques, the signup service can identify the user registration session and also validate the authentication request coming from sign in service. In response, the signup service can return a SAML response to the sign in service. The sign in service can further validate that the SAML response is electronically signed by signup service, and other validations specified by the SAML specification. After finishing the federated login process, the user can log into CI console, and start exploring the rest of CI features. During this process, the user can provide its username/password at account signup phrase, and the user can be securely signed into CI automatically. The tenant admin can also see the audit logs for the first login. This present embodiments can include implementing a simple Identity Provider that can vouch for the user's identity after sign up on a temporary basis after the user has completed sign up.

In some embodiments, the client can sign up an Account in Cloud Portal and provides their account/tenancy name, email, and password etc. After successful signup, Cloud Portal can redirect the user to CI console, with a query string. Since the user is not authenticated, the Console can redirect the request to SOUP and pass along the query string. The SOUP can see the request with a query string, and the SOUP can identify that the tenancy is created less than a configured timespan (e.g., under bootstrapping), the SOUP can start the service provider initiated SAML flow and redirect the browser to Cloud Portal with a SAML Request. Cloud Portal can process the SAML request, authenticate the user via session, and generate/return with a SAML response.

The end user can sign up in New Signup Service and provide their email, tenancy name, and password in the process. After successful sign-up, New Signup Service can redirect the user to CI console, with an additional query string. Since the user is not authenticated, New Signup Service can redirect to SOUP and pass along the query string. SOUP can see the query string. The SOUP can initiate a SAML request to New signup Service. New Signup Service can process the SAML request, authenticate the user, and generate/return with a SAML response. SOUP can verify the SAML response, authenticate the user, and redirect the user to CI Console with a token allowing access to the CI user session.

The Cloud Portal can maintain a server side session, where a cookie with server side session ID can be returned to browser during account sign up phrases. When SAML request is sent to Cloud Portal, browser can send back the cookie, which can include a session ID to Cloud Portal. Thereafter, Cloud Portal can be able to find the sign up session. SOUP can verify the SAML response, then redirect the user to CI Console with security token and id token. The SAML assertion can include a native user name, the federated login process can validate if the native user exists or not. Once user login into CI console, the user can start the CI experience as the tenancy admin. This user is created via account sign up, which is the first user in a tenancy, and also be tenancy admin. If user clicks logout from console, the user can be redirected to SOUP sign in page. The user can use its own credentials to login into console again.

In the present embodiments, the sign-up service can serve as an Identity Provider (IdP) using SAML 2.0 for the end user after the user completes sign up. This IdP can be invoked for logins with a query parameter identifying the sign-on application as the name of the identity provider.

A temporary IdP can automatically authenticate the user after sign up. In some embodiments, the sign-up service would provide an Identity Provider (IdP) using SAML 2.0 for the end user after the user completes sign up. This IdP can be invoked for logins with a query parameter identifying the sign-on application as the name of the identity provider.

The end user can sign up in Cloud Portal and provide their email, tenancy name, and password in the process. After successful sign-up, Cloud Portal can redirect the user to CI console, with an additional query string providing a provider and an indication to sign up a new account. Since the user is not authenticated, Console can redirect to SOUP and pass along the query string. SOUP can see the query string and initiate a SAML request to Cloud Portal. Cloud Portal can process the SAML request, authenticate the user, and generate/return with a SAML response. SOUP would verify the SAML response, authenticate the user, then redirect the user to CI Console with a token allowing access to the CI user session.

As an example, when an unauthenticated user navigates to the CI console, the console can redirect the user to SOUP. On SOUP, the user can choose to enter their username and password directly or they can select an Identity Provider. When the user selects an IdP to sign in, the SOUP page can redirect the user to the IdP to authenticate with a request for a SAML token. In many cases, the end user provides their IdP username and password directly into the IdP page, but the IdP can also authenticate the user based on other factors (e.g., multi-factor authentication (MFA)) or the network location of the client user agent. After successfully authenticating with the IdP, the user can be redirected back to SOUP with a SAML token that confirms successful authentication. SOUP can parse that token and then redirect the user to their original destination, CI console with a JSON Web Token (JWT) for the CI user session. When a user authenticates using an IdP, their user account visibly can be associated with the IdP.

The present embodiments can include an implementation of single sign on with CI acting as a 'Relying Party' or 'Service Provider' and the Identity Provider asserting the user's Identity using a SAML token.

In the present embodiments, the system as described herein can provide an Identity Provider for the end user after the user completes sign up. This can include a temporary predefined Identity Provider with a CI Identity and Access Management (IAM) for a duration of time after tenancy creation (with federation trusts set up between IAM and sign-on app beforehand). This IdP can be invoked for logins with a query parameter identifying the sign-on application as the name of the identity provider.

A. System Overview

FIG. 1 is a block diagram 100 for an automatic sign in upon account signup, according to at least one embodiment. As shown in FIG. 1, a client computer 102 (e.g., computer, mobile device) can communicate with various devices (e.g., cloud identity provider portal computer 104, cloud infrastructure console 106, sign in portal computer 108) via network(s) 110.

The client computer 102 can include a computing device associated with a client configured to access the cloud infrastructure. For instance, the client computer can sign up for a service (e.g., to perform cloud computing services) by interacting with a cloud identity provider portal 104. The client computer 102 can comprise both a web browser and an indexed database to store various data (e.g., a key pair, tokens). The client computer 102 can perform the authentication process to implement an automatic sign up upon sign up as described herein.

The cloud identity provider portal computer 104 can include a computing device (or series of interconnected communication devices) configured to provide a portal allowing a client to sign up for a cloud infrastructure service. The cloud identity provider portal computer 104 can be separate from the cloud infrastructure such that the cloud identity provider portal computer 104 can perform account sign up and set up processes. In some instances, if a request to set up a new account is sent to a cloud infrastructure node (e.g., console 106), the console 106 can redirect the request to the cloud identity provider portal computer 104.

The cloud infrastructure can include a cloud infrastructure console 106. The cloud infrastructure console 106 can include a device or series of interconnected devices used to sign into the CI system. For instance, the cloud infrastructure console 106 can identify a new account created by the cloud identity provider portal computer 104 and redirect a request to sign into the new account to a sign in portal computer (or SOUP) 108.

The sign in portal computer 108 can be configured to obtain a request to sign into a new account, perform a verification process (e.g., a SAML process), and sign the client computer 102 into the cloud infrastructure. The sign in portal computer 108 can provide a security token and identity token for subsequent sign into the cloud infrastructure.

Figure 2:
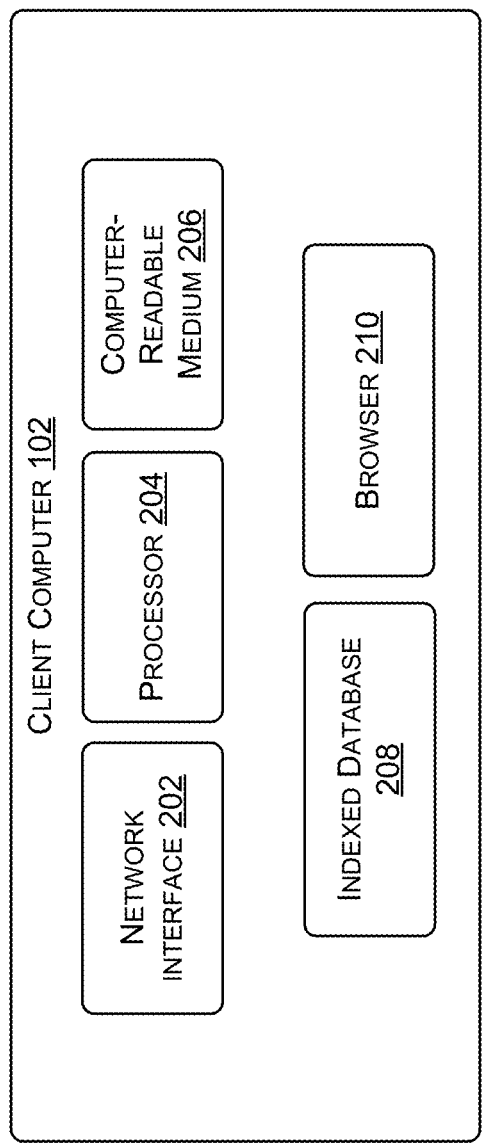
FIG. 2 is an illustration of an example client computer, according to at least one embodiment.

FIG. 2 is an illustration of an example client computer 102. As noted above, the client computer 102 can provide a request to sign up for an account for cloud infrastructure services and can be automatically signed in upon sign up.

The client computer 102 can include a network interface 202 facilitating data communication with devices in a system (e.g., the system as described in FIG. 1). The client computer 102 can also include a processor 204 and a computer-readable medium 206. The computer-readable medium 206 can include instructions that, when executed by the processor 204, cause the processor 204 to perform processing tasks as described herein.

The client computer 102 can include a indexed database 208. The indexed database 208 can include a database configured to maintain data relating to the sign up and sign in to the cloud infrastructure. For example, the indexed database 208 can maintain a key pair obtained from a cloud infrastructure console and/or a security token and identity token provided by a SOUP. The data maintained in indexed database 208 can be used for subsequent sign into the cloud infrastructure services.

The client computer 102 can also include a browser 210. The browser 210 can include a web browser configured to interact with the cloud identity provider portal, cloud infrastructure console, and SOUP to facilitate automatic sign in upon sign up. For instance, the browser 210 can send a request to create a new account to the cloud identity provider portal via a network (e.g., the internet).

B. Automatic Sign in Upon Sign Up Overview

As noted above, the present embodiments can implicitly set up federation between a Cloud Portal and a cloud infrastructure allow for automatic sign into CI console after signing up an cloud account. A sequence diagram for automatic sign in upon sign up is shown in FIG. 3.

Figure 3:
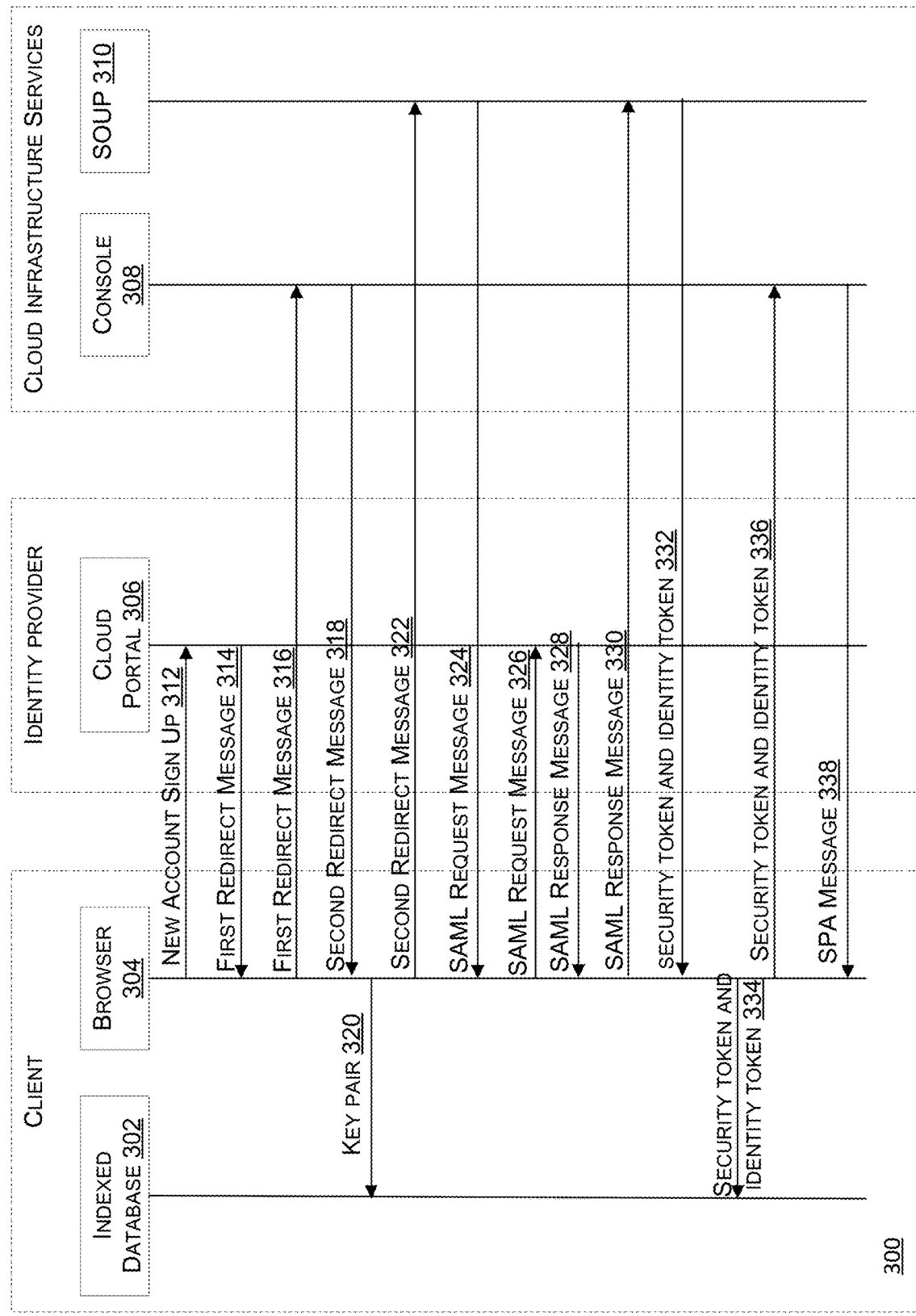
FIG. 3 is a signaling process for a method for performing an automatic sign in upon account signup, according to at least one embodiment.

FIG. 3 is a signaling process 300 for an implicit federating sign in with a cloud portal. The system can include a client, identity provider, and CI services. The client can include an indexed database (db) 302 and a browser 304. The identity provider can include a cloud portal 306. CI services can include a console 308 and SOUP 310.

At step 312, user can send a request for new account sign up to the browser. The request for the new account sign up can include user details, such as a username, name, e-mail address, password, etc. The request for a new account can also specify one or more services (e.g., services provided by the cloud infrastructure) for which the user is registering. As noted above, cloud identity provider portal computer 306 can perform a sign up process and can be separate from a cloud infrastructure portal performing desired services (e.g., cloud computing services). In some embodiments, the cloud portal can process a workflow with new account sign up to establish the new account.

At step 314, the cloud identity provider portal computer 306 can process the request and send a first redirect message that identifies the cloud infrastructure console 308 to the client computer web browser 304. The first redirect message can specify a tenant and a provider.

At step 316, the web browser 304 can forward the first redirect message to the cloud infrastructure console 308. The cloud infrastructure console 308 can include a computing device associated with the cloud infrastructure. After successful signup, the cloud portal 306 can redirect the user to OCI console 308 with a query string.

At step 318, the console 308 can send a second redirect message to the browser 304. The second redirect message can identify the SOUP 310 to perform an authentication process. Since the client is not yet authenticated, the second redirect message can be directed towards the SOUP 310 and the query string can be passed along with the second redirect message.

At step 320, the browser 304 can generate a key pair to the indexed database 302. The indexed database 302 can store the key pair, the private key included in the key pair can be used to sign the request, and the public key included in the key pair can be used to validate the signature of the signed request.

At step 322, the browser can forward the second redirect message to a SOUP 310. The SOUP can see the request with the query string specifying the tenant and provider. Further, the SOUP can identify that the tenancy was created less than a threshold time, indicating that the new account was recently created. The SOUP can initiate the service provider initiated SAML flow and redirect the browser to Cloud Portal with a SAML Request.

At step 324, the SOUP 310 can provide a SAML request to the browser. The SAML request can direct the browser 304 to the cloud portal 306 for authenticating the user for a server side session.

At step 326, the browser 304 can forward the SAML request to the cloud portal 306. The cloud portal 306 can process the SAML request, authenticate the user via the server side session, and generate a SAML response. The cloud portal 306 can maintain a server side session by returning a cookie with the server side session ID during the account sign up phase. When the SAML request is sent to the cloud portal 306, the browser 304 can provide the cookie that contains the server side session ID for the cloud portal 306 to identify the sign up session.

At step 328, the cloud portal 306 can forward a SAML response to the browser 304. The SAML response can include a XHTML format. The SAML response can be redirected to the SOUP for verification of the client browser.

At step 330, the browser 304 can forward a SAML response message to the SOUP 310. The SOUP 310 can process the SAML response to verify the client browser using data included in the SAML response. The SOUP 310 can generate a security token and ID token for the client browser 304. The automatic sign in after signup via federation can include a federated login scenario where the SAML response can include a native user name, and the federated login process can validate whether the native user exists.

At step 332, the SOUP 310 can send the security token and the ID token to the browser 304.

At step 334, the browser 304 can send the ID token and security token to the indexed database 302 for storage by the database 302.

At step 336, the browser 304 can provide the security token and identity token to the console 308 to allow for automatic sign in to the console 308.

At step 338, the console 308 can send a console SPA message to the browser 304. If the client clicks logout from console, the client will be redirected to SOUP sign in page. The client can use its own credentials to login into console again.

As described herein, the federation with the Cloud Portal can be implicit, and persisting the federation metadata with Cloud Portal in a backend database is not needed. Instead, the cloud portal entity Id can be saved, redirecting a uniform resource locator (URL), as well as signing certificate into the configuration. The Cloud Portal can use a provider name with a GUID to minimize the provider name conflict that the client can choose for their real federation setup. The implicit federation configuration may support a list of providers so as to support cloud portal services.

The SOUP can generate the SAML Request and redirect the request to the identity provider portal. In order to generate the SAML Request, the SOUP may need to fetch the provider information from the backend, which essentially go to data plane to fetch the provider for this tenancy based on tenancy name and provider name. Once the SOUP obtains a SAML Response from the Cloud Portal, the SOUP can validate the SAML Response by attempting to fetch the configured identity providers for this tenancy. If the tenancy is under bootstrapping, the implicit Cloud Portal identity provider may be loaded from our configuration.

This implicit federation may include a native user name in a SAML response message, which can also be referred to as a concrete SAML user. To support the concrete SAML user for federation with Cloud Portal, the SAML Response from Cloud Portal can contain a UID attribute, where the attribute value can be the native user name in the IAM. Otherwise, the federated login can fail. The configuration can specify whether the configuration is a concrete SAML is needed or not.

The SOUP can call a service for a validate client API, where an identity provider ID may be provided. For implicit federation, the IdP may not be persisted in a database. In some instances, the SOUP can send a flag to skip provider validation in the request for the implicit federated login.

The implicit federated login can be audited. If there is an implicit federated login while the tenancy is not under bootstrapping, the request can be rejected by SOUP, and metrics can be obtained accordingly. The system can update a SOUP dashboard to display the implicit federations.

The system can update integration tests to simulate the state that tenancy is under bootstrapping. The system can finish the implicit federation with the simulated Cloud Portal IdP. The system can also have an integration test for the scenario that implicit federation fails when tenancy is not under bootstrapping.

The browser can send a resource module API call to New Signup Service to create a Cloud Account. New Signup Service submits a request to create the account. After the account creation request has been submitted successfully, the New Signup Service can save the user email address and tenant name into the cookies. New Signup Service can send a success response back to the browser. The Sign Up page can start polling to see if the account creation has been completed by sending a call to the New Signup Service.

The new Signup Service can submit a request to check the account creation status. If the account has been created, an expiration time can be saved into the cookies to be current time plus a time duration. When the sign up page receives a status indicating the account has been created, it can redirect the client to CI Console with additional query.

The SOUP can check if the SOUP URL contains a string. The service can check if the tenant name exists and has been created within the specified time duration (e.g., 5 minutes). The service can generate a SAML request with an identity provider entity ID as the entity ID and the identity provider redirect URL being the URL that SAML Request is going to send. The system can redirect the page to identity provider redirect URL, with a parameter with the SAML request in base64 encoding.

If authentication successful, the Signup Service can build a SAML assertion. The assertion can have an attribute statement containing the user name. The Signup Service can sign the assertion using signup service's credentials (certificate, key) with a certificate (public key). It can build the SAML response with the assertion in the previous step and return the SAML response in a form on the new page. The page can submit the form containing the SAML response to the SOUP URL. The SOUP can verify SAML response by checking the response/assertion signature, and authenticates the user according to the username specified in the UID attribute in the assertion.

The encryption key, SOUP cert, signup certificate, and signup primary key can be stored in one or more storage module. The New Signup Service can retrieve the stored data during the service start up. An Encryption key (a 512-bit string) can be as hash key to hash info that stores data in the cookies, such as email and expiration time of the cookies. A SOUP certificate can include verifying the SAML request signature from SOUP. The algorithm can use a cryptographic hash, and encrypting the SAML assertion using an encryption key.

Figure 4:
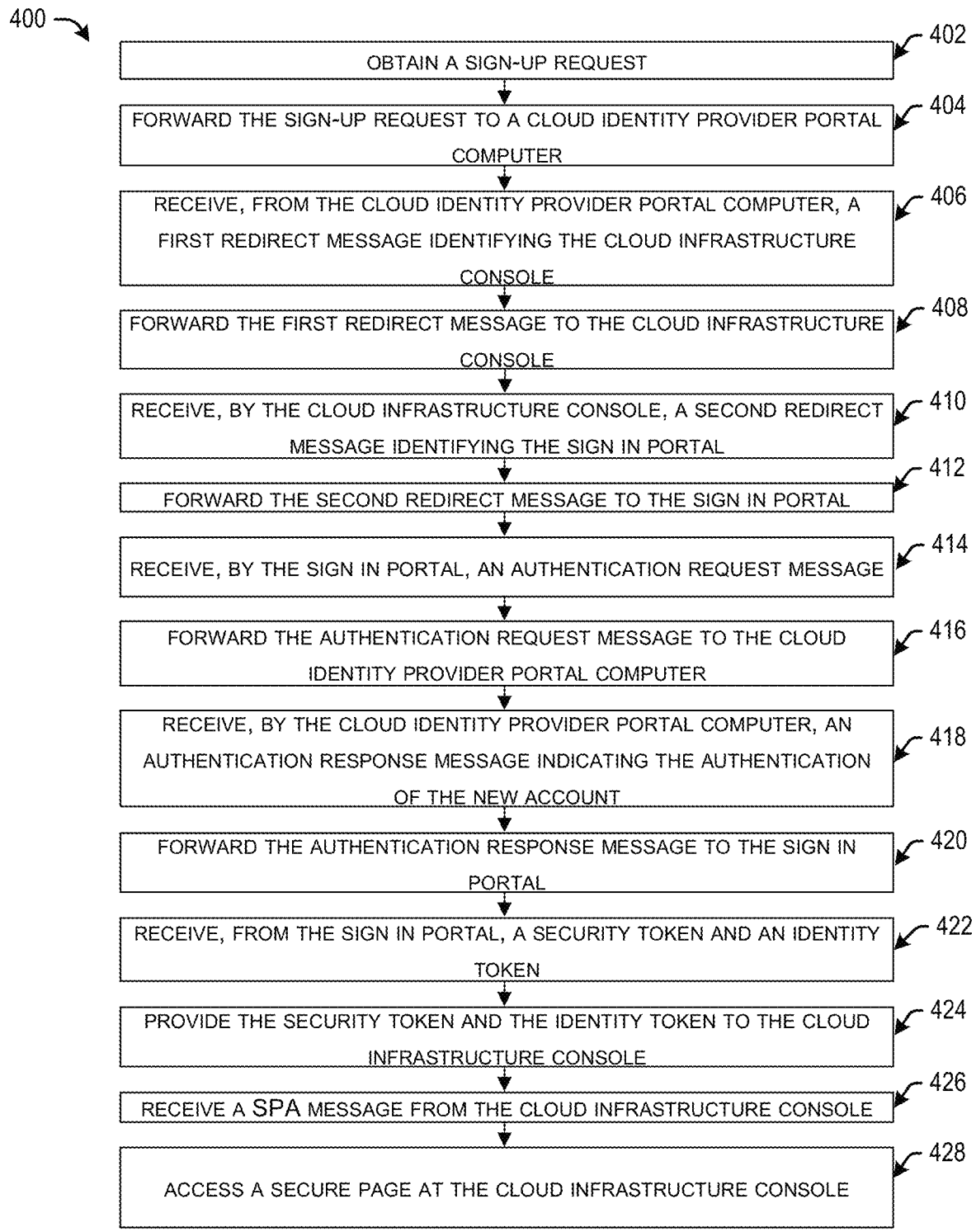
FIG. 4 is a block diagram of a method for performing an automatic sign in upon account signup, according to at least one embodiment.

FIG. 4 is a block diagram of a method 400 to securely access both an identity provider portal and a cloud infrastructure console during a single interaction, according to at least one embodiment. The method can be performed by a client web browser to log into both an identity provider portal and a cloud infrastructure console during a single interaction.

At 402, the browser can obtain a sign-up request. The sign-up request can request to sign up a new account to access a cloud infrastructure service. For instance, the client, via a client computer, can provide an instruction to sign up for a cloud infrastructure service.

At 404, the sign-up request can be sent from the browser to a cloud identity provider portal computer. The cloud identity provider portal computer can perform a workflow to generate a new account.

At 406, the browser can receive, from the cloud identity provider portal computer, a first redirect message identifying the cloud infrastructure console. In some instances, the first redirect message includes a query string specifying a tenant and a provider for access to cloud identity provider portal computer. The query string can be passed in the second redirect message identifying the sign in portal. In this example, the sign in portal can then generate the authorization request message using the query string.

In some embodiments, responsive to receiving the first redirect message from the cloud infrastructure console, the client computer can store a key pair included in the first redirect message at an indexed database.

At 408, the first redirect message can be forwarded to the cloud infrastructure console.

At 410, the browser can receive, by the cloud infrastructure console, a second redirect message identifying the sign in portal. Receiving the second redirect message can be performed responsive to determining that the new account is not authenticated.

At 412, the browser can forward the second redirect message to the sign in portal. In some instances, the sign in portal and the cloud identity provider portal computer can include agreed identity provider parameters comprising an entity identifier, a redirect uniform resource locator (URL), and a signing certificate.

At 414, the browser can receive, by the sign in portal, an authentication request message. The authentication request message and the authentication response message as described herein can be formatted in a Security Assertion Markup Language (SAML) format.

In some embodiments, the authentication request message can include a digital signature of the sign in portal, and the authentication response message can include a digital signature from the cloud identity provider portal computer. The authentication request message and authentication response message can be encrypted using a public key included in the key pair.

At 416, the browser can forward the authentication request message to the cloud identity provider portal computer. The cloud identity provider portal computer can authenticate the new account using data included in the sign-up request. The authentication request message can include a SAML request message as described herein.

In some instances, the web browser can obtain a cookie from the cloud identity provider portal computer with a server side session ID to maintain a server side session with the cloud identity provider portal computer during authentication of the new account. The web browser can be configured to send the cookie to the cloud identity provider portal computer when the authentication request message is forwarded to the cloud identity provider portal computer. The cloud identity provider portal computer can be configured to identify a sign up session with the web browser using the cookie identifying a session ID specifying the sign up session.

At 418, the browser can receive, by the cloud identity provider portal computer, an authentication response message indicating the authentication of the new account. The authentication response message can include a SAML response message as described herein. In some instances, authentication response message is received from the sign in portal responsive to a time duration between the obtaining of the sign-up request and the forwarding of the second redirect message to the sign in portal being within a threshold time duration.

At 420, the browser can forward the authentication response message to the sign in portal. The sign in portal can verify the data included in the authentication response message to authenticate the client browser.

In some instances, for security considerations, SAML Request and SAML Response can be exchanged via a transport layer security (TLS) communication channel. The SAML Request can be signed by SOUP. The SAML Response can be signed by Cloud Portal, and SAML assertions can be encrypted by using SOUP's public key. SOUP can include Cloud Portal's signing certificate in its application configuration, where Cloud Portal can have SOUP's signing certificate in its application configuration.

At 422, the browser can receive, from the sign in portal, a security token and an identity (or ID) token. Responsive to receiving the security token and the ID token from the sign in portal, the security token and the identity token can be stored at the indexed database.

At 424, providing the security token and the identity token to the cloud infrastructure console. Providing the security token and the identity token to the cloud infrastructure console can allow for the browser to sign into the cloud infrastructure.

At 426, the browser can receive a Secure Password Authentication (SPA) message from the cloud infrastructure console.

At 428, the browser can access a secure page at the cloud infrastructure console. This can be performed responsive to providing the security token and the identity token at the cloud infrastructure console. In some instances, the browser can use data included in the SPA message to access the secure page at the cloud infrastructure console.

C. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
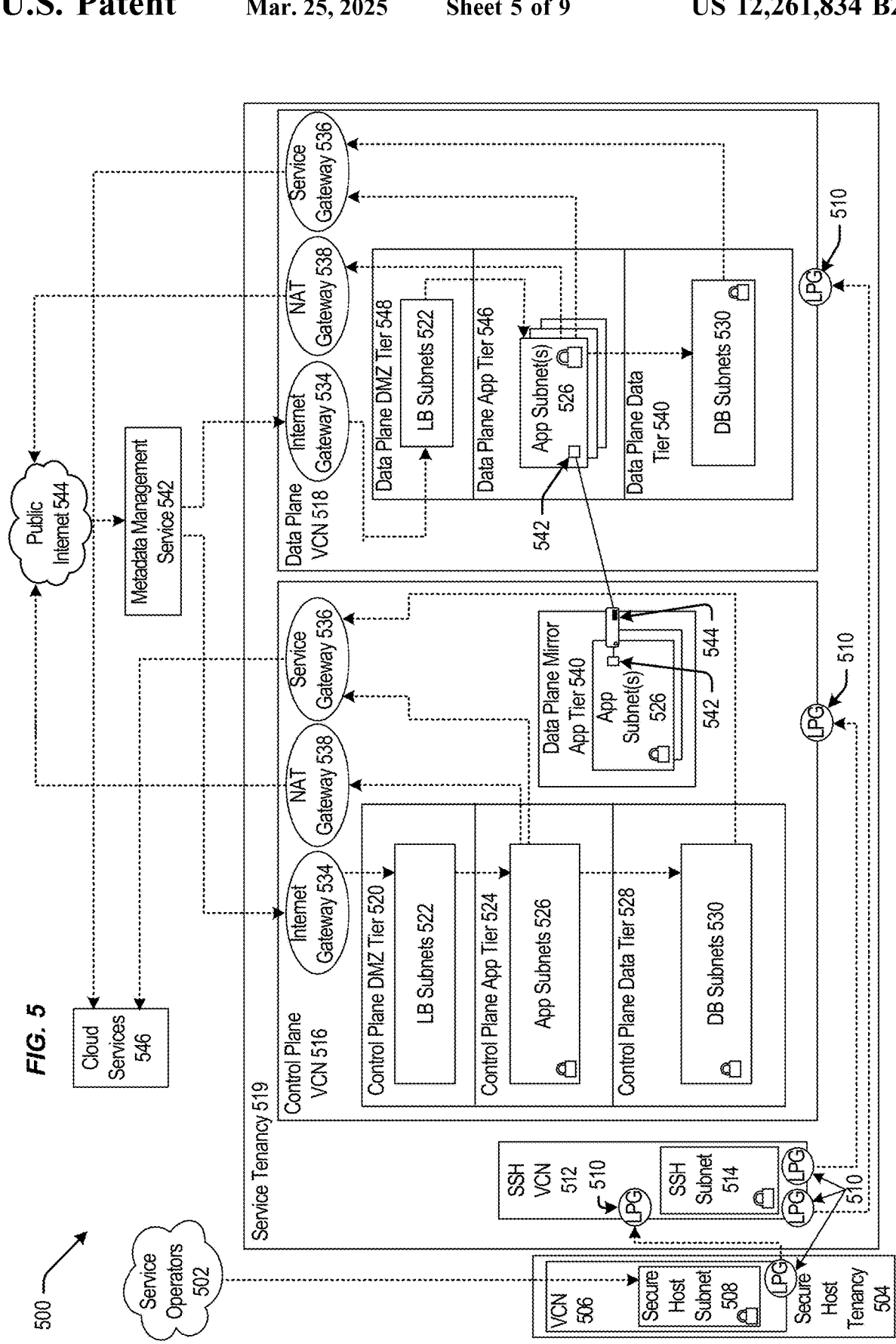
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep security breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Memory that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of security, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
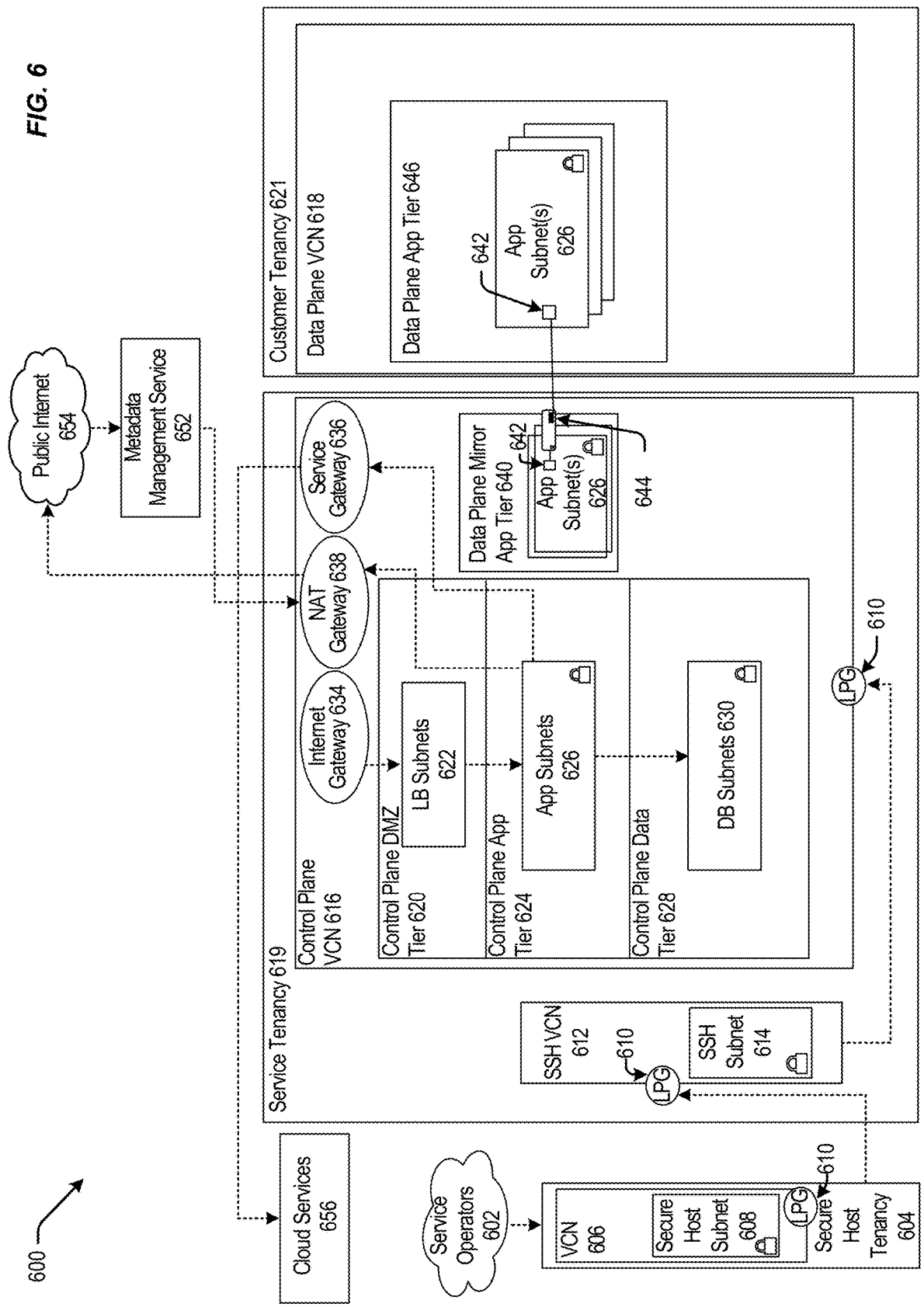
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 502 of FIG. 5) can be communicatively coupled to a secure host tenancy 604 (e.g. the secure host tenancy 504 of FIG. 5) that can include a virtual cloud network (VCN) 606 (e.g. the VCN 506 of FIG. 5) and a secure host subnet 608 (e.g. the secure host subnet 508 of FIG. 5). The VCN 606 can include a local peering gateway (LPG) 610 (e.g. the LPG 510 of FIG. 5) that can be communicatively coupled to a secure shell (SSH) VCN 612 (e.g. the SSH VCN 512 of FIG. 5) via an LPG 510 contained in the SSH VCN 612. The SSH VCN 612 can include an SSH subnet 614 (e.g. the SSH subnet 514 of FIG. 5), and the SSH VCN 612 can be communicatively coupled to a control plane VCN 616 (e.g. the control plane VCN 516 of FIG. 5) via an LPG 610 contained in the control plane VCN 616. The control plane VCN 616 can be contained in a service tenancy 619 (e.g. the service tenancy 519 of FIG. 5), and the data plane VCN 618 (e.g. the data plane VCN 518 of FIG. 5) can be contained in a customer tenancy 621 that may be owned or operated by users, or customers, of the system.

The control plane VCN 616 can include a control plane DMZ tier 620 (e.g. the control plane DMZ tier 520 of FIG. 5) that can include LB subnet(s) 622 (e.g. LB subnet(s) 522 of FIG. 5), a control plane app tier 624 (e.g. the control plane app tier 524 of FIG. 5) that can include app subnet(s) 626 (e.g. app subnet(s) 526 of FIG. 5), a control plane data tier 628 (e.g. the control plane data tier 528 of FIG. 5) that can include database (DB) subnet(s) 630 (e.g. similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g. the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g. the service gateway of FIG. 5) and a network address translation (NAT) gateway 638 (e.g. the NAT gateway 538 of FIG. 5). The control plane VCN 616 can include the service gateway 636 and the NAT gateway 638.

The control plane VCN 616 can include a data plane mirror app tier 640 (e.g. the data plane mirror app tier 540 of FIG. 5) that can include app subnet(s) 626. The app subnet(s) 626 contained in the data plane mirror app tier 640 can include a virtual network interface controller (VNIC) 642 (e.g. the VNIC of 542) that can execute a compute instance 644 (e.g. similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g. the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g. the metadata management service 552 of FIG. 5) that can be communicatively coupled to public Internet 654 (e.g. public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g. cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
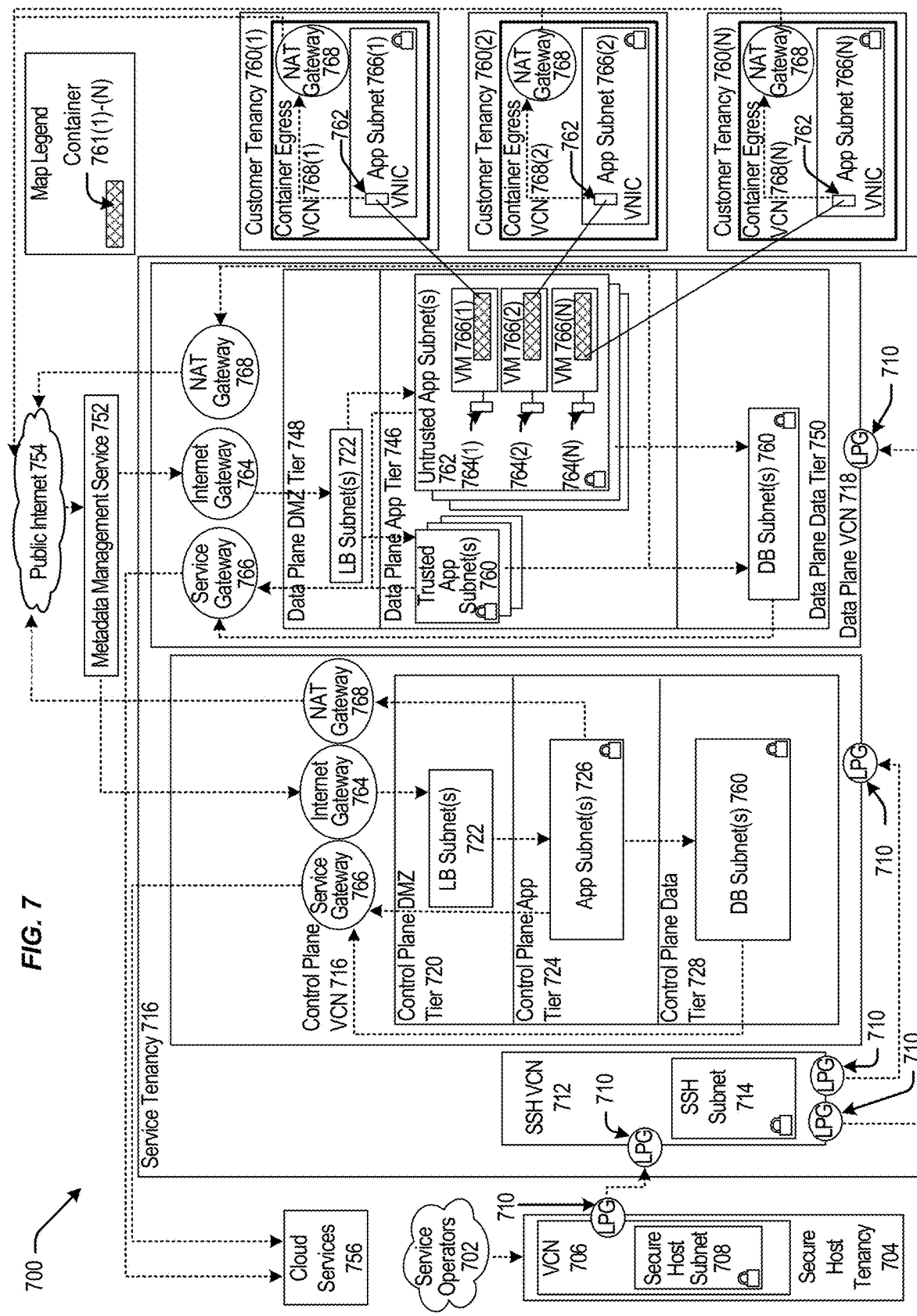
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 502 of FIG. 5) can be communicatively coupled to a secure host tenancy 704 (e.g. the secure host tenancy 504 of FIG. 5) that can include a virtual cloud network (VCN) 706 (e.g. the VCN 506 of FIG. 5) and a secure host subnet 708 (e.g. the secure host subnet 508 of FIG. 5). The VCN 706 can include an LPG 710 (e.g. the LPG 510 of FIG. 5) that can be communicatively coupled to an SSH VCN 712 (e.g. the SSH VCN 512 of FIG. 5) via an LPG 710 contained in the SSH VCN 712. The SSH VCN 712 can include an SSH subnet 714 (e.g. the SSH subnet 514 of FIG. 5), and the SSH VCN 712 can be communicatively coupled to a control plane VCN 716 (e.g. the control plane VCN 516 of FIG. 5) via an LPG 710 contained in the control plane VCN 716 and to a data plane VCN 718 (e.g. the data plane VCN 518 of FIG. 5) via an LPG 710 contained in the data plane VCN 718. The control plane VCN 716 and the data plane VCN 718 can be contained in a service tenancy 719 (e.g. the service tenancy 519 of FIG. 5).

The control plane VCN 716 can include a control plane DMZ tier 720 (e.g. the control plane DMZ tier 520 of FIG. 5) that can include load balancer (LB) subnet(s) 722 (e.g. LB subnet(s) 522 of FIG. 5), a control plane app tier 724 (e.g. the control plane app tier 524 of FIG. 5) that can include app subnet(s) 726 (e.g. similar to app subnet(s) 526 of FIG. 5), a control plane data tier 728 (e.g. the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g. the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 5) and a network address translation (NAT) gateway 738 (e.g. the NAT gateway 538 of FIG. 5). The control plane VCN 716 can include the service gateway 736 and the NAT gateway 738.

The data plane VCN 718 can include a data plane app tier 746 (e.g. the data plane app tier 546 of FIG. 5), a data plane DMZ tier 748 (e.g. the data plane DMZ tier 548 of FIG. 5), and a data plane data tier 750 (e.g. the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g. public Internet 554 of FIG. 5).

The Internet gateway 734 contained in the control plane VCN 716 and contained in the data plane VCN 718 can be communicatively coupled to a metadata management service 752 (e.g. the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
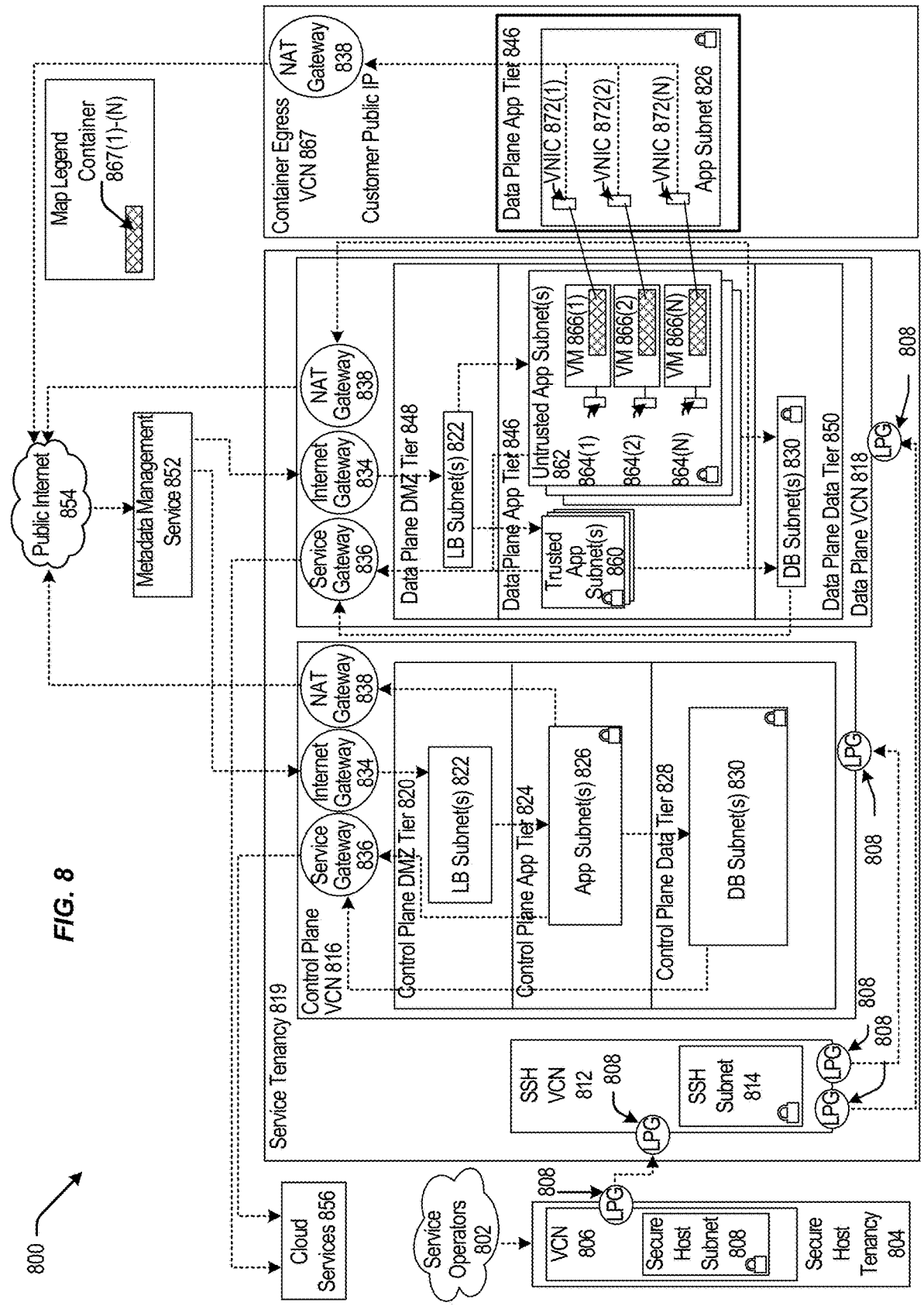
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 502 of FIG. 5) can be communicatively coupled to a secure host tenancy 804 (e.g. the secure host tenancy 504 of FIG. 5) that can include a virtual cloud network (VCN) 806 (e.g. the VCN 506 of FIG. 5) and a secure host subnet 808 (e.g. the secure host subnet 508 of FIG. 5). The VCN 806 can include an LPG 810 (e.g. the LPG 510 of FIG. 5) that can be communicatively coupled to an SSH VCN 812 (e.g. the SSH VCN 512 of FIG. 5) via an LPG 810 contained in the SSH VCN 812. The SSH VCN 812 can include an SSH subnet 814 (e.g. the SSH subnet 514 of FIG. 5), and the SSH VCN 812 can be communicatively coupled to a control plane VCN 816 (e.g. the control plane VCN 516 of FIG. 5) via an LPG 810 contained in the control plane VCN 816 and to a data plane VCN 818 (e.g. the data plane 518 of FIG. 5) via an LPG 810 contained in the data plane VCN 818. The control plane VCN 816 and the data plane VCN 818 can be contained in a service tenancy 819 (e.g. the service tenancy 519 of FIG. 5).

The control plane VCN 816 can include a control plane DMZ tier 820 (e.g. the control plane DMZ tier 520 of FIG. 5) that can include LB subnet(s) 822 (e.g. LB subnet(s) 522 of FIG. 5), a control plane app tier 824 (e.g. the control plane app tier 524 of FIG. 5) that can include app subnet(s) 826 (e.g. app subnet(s) 526 of FIG. 5), a control plane data tier 828 (e.g. the control plane data tier 528 of FIG. 5) that can include DB subnet(s) 830 (e.g. DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g. the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 5) and a network address translation (NAT) gateway 838 (e.g. the NAT gateway 538 of FIG. 5). The control plane VCN 816 can include the service gateway 836 and the NAT gateway 838.

The data plane VCN 818 can include a data plane app tier 846 (e.g. the data plane app tier 546 of FIG. 5), a data plane DMZ tier 848 (e.g. the data plane DMZ tier 548 of FIG. 5), and a data plane data tier 850 (e.g. the data plane data tier 550 of FIG. 5). The data plane DMZ tier 848 can include LB subnet(s) 822 that can be communicatively coupled to trusted app subnet(s) 860 (e.g. trusted app subnet(s) 760 of FIG. 7) and untrusted app subnet(s) 862 (e.g. untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g. public Internet 554 of FIG. 5).

The Internet gateway 834 contained in the control plane VCN 816 and contained in the data plane VCN 818 can be communicatively coupled to a metadata management service 852 (e.g. the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the FIGURES may have other components than those depicted. Further, the embodiments shown in the FIGURES are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (CI) provided by the present assignee.

Figure 9:
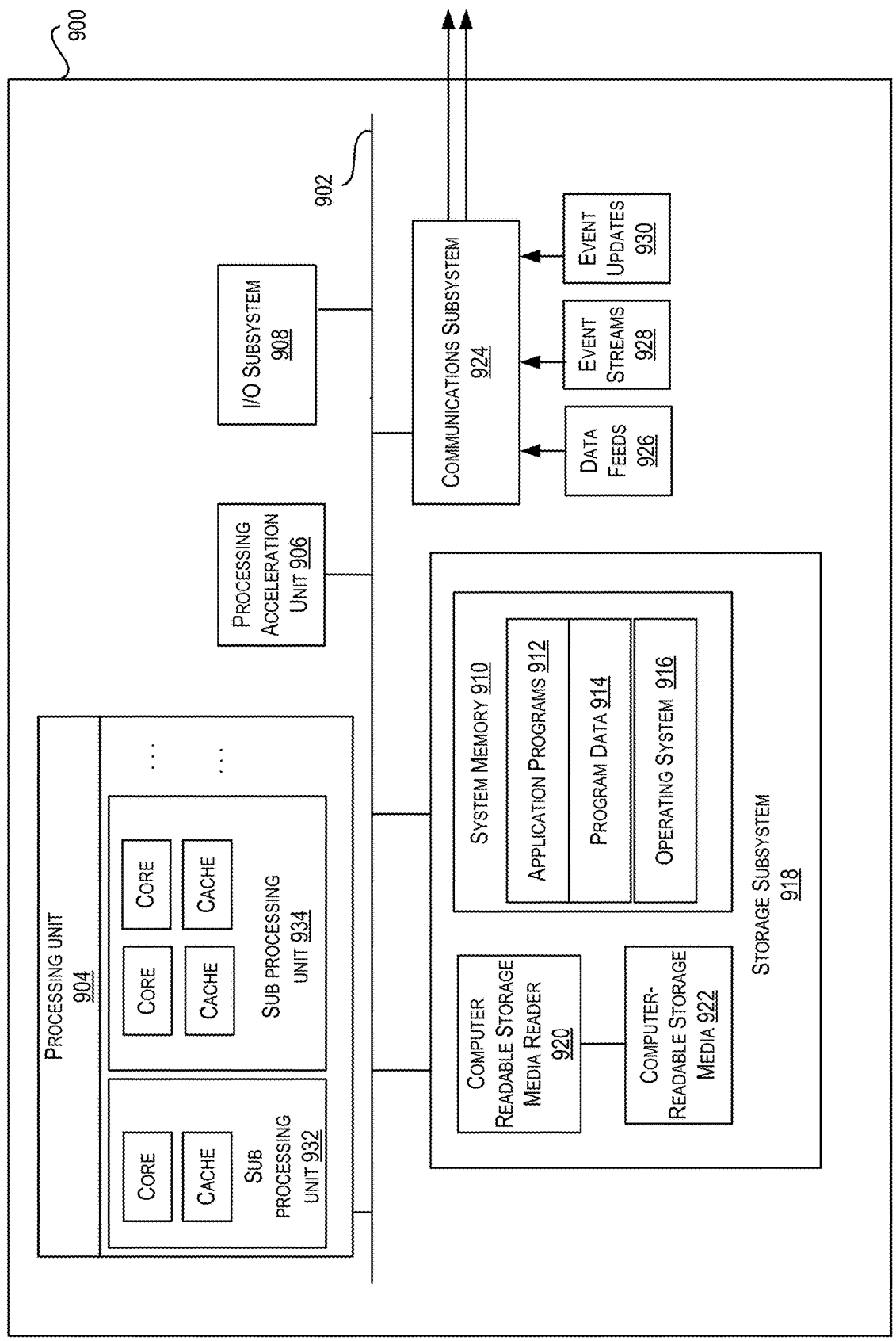
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of sClal networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    obtaining, by a client computer, a sign-up request, the sign-up request for requesting to sign up a new account to a cloud infrastructure console;
    receiving, from a sign on portal, an authentication request message;
    forwarding, by the client computer, the authentication request message to authenticate the new account using data included in the sign-up request;
    receiving, by the client computer, an authentication response message indicating the authentication of the new account;
    forwarding, by the client computer, the authentication response message to the sign on portal;
    receiving, from the sign on portal, a security token and an identity token;
    providing, by the client computer, the security token and the identity token to the cloud infrastructure console;
    receiving, by the client computer, a Secure Password Authentication (SPA) message from the cloud infrastructure console; and
    accessing, by the client computer, a secure page at the cloud infrastructure console based at least in part on the SPA message.

2. The method of claim 1, further comprising:
    receiving, from the cloud infrastructure console, a redirect message identifying a sign on portal, wherein redirect message is received responsive to determining that the new account is not authenticated; and
    forwarding the redirect message to the sign on portal, wherein the authentication response message is received from the sign on portal responsive to a time duration between the obtaining of the sign-up request and the forwarding of the redirect message to the sign on portal being within a threshold time duration.

3. The method of claim 2, further comprising:
    receiving, from the cloud identity provider portal computer, a first redirect message identifying the cloud infrastructure console; and
    forwarding the first redirect message to the cloud infrastructure console, wherein the first redirect message identifying the cloud infrastructure console includes a query string specifying a tenant and a provider for access to cloud identity provider portal computer, and wherein the query string is passed in the redirect message identifying the sign on portal, and wherein the sign on portal generates the authentication request message using the query string.

4. The method of claim 1, wherein a client web browser is configured to obtain a cookie from the cloud identity provider portal computer with a server side session ID to maintain a server side session with the cloud identity provider portal computer during authentication of the new account.

5. The method of claim 4, wherein the client web browser is configured to send the cookie to the cloud identity provider portal computer when the authentication request message is forwarded to the cloud identity provider portal computer, wherein the cloud identity provider portal computer is configured to identify a sign up session with the client web browser using the cookie identifying a session ID specifying the sign up session.

6. The method of claim 1, wherein the authentication request message and the authentication response message are formatted in a Security Assertion Markup Language (SAML).

7. The method of claim 1, further comprising:
    receiving, by the client computer, a first redirect message identifying the cloud infrastructure console;
    forwarding the first redirect message to the cloud infrastructure console;
    responsive to receiving the first redirect message from the cloud infrastructure console, storing a key pair included in the first redirect message at an indexed database; and
    responsive to receiving the security token and the identity token from the sign on portal, storing the security token and the identity token at the indexed database.

8. The method of claim 7, wherein the authentication request message includes a digital signature of the sign on portal, and the authentication response message includes a digital signature from the cloud identity provider portal computer, and wherein the authentication request message and authentication response message are encrypted using a public key included in the key pair.

9. A client computer comprising:
    a processor; and
    a computer-readable medium including instructions that, when executed by the processor, cause the processor to:
        obtain a sign-up request, the sign-up request for requesting to sign up a new account to a cloud infrastructure console;
        receive, from a sign on portal, an authentication request message;
        forward the authentication request message to authenticate the new account using data included in the sign-up request;
        receive an authentication response message indicating the authentication of the new account;
        forward the authentication response message to the sign on portal;
        receive, from the sign on portal, a security token and an identity token;

provide the security token and the identity token to the cloud infrastructure console;

receive a Secure Password Authentication (SPA) message from the cloud infrastructure console; and access a secure page at the cloud infrastructure console based at least in part on the SPA message.

10. The client computer of claim 9, wherein the processor is further caused to:

receive, from the cloud infrastructure console, a redirect message identifying a sign on portal, wherein redirect message is received responsive to determining that the new account is not authenticated; and forward the redirect message to the sign on portal, wherein the authentication response message is received from the sign on portal responsive to a time duration between the obtaining of the sign-up request and the forwarding of the redirect message to the sign on portal being within a threshold time duration.

11. The client computer of claim 10, wherein the processor is further caused to:

receive, from the cloud identity provider portal computer, a first redirect message identifying the cloud infrastructure console; and forward the first redirect message to the cloud infrastructure console, wherein the first redirect message identifying the cloud infrastructure console includes a query string specifying a tenant and a provider for access to cloud identity provider portal computer, and wherein the query string is passed in the redirect message identifying the sign on portal, and wherein the sign on portal generates the authentication request message using the query string.

12. The client computer of claim 9, wherein a client web browser is configured to obtain a cookie from the cloud identity provider portal computer with a server side session ID to maintain a server side session with the cloud identity provider portal computer during authentication of the new account.

13. The client computer of claim 12, wherein the client web browser is configured to send the cookie to the cloud identity provider portal computer when the authentication request message is forwarded to the cloud identity provider portal computer, wherein the cloud identity provider portal computer is configured to identify a sign up session with the client web browser using the cookie identifying a session ID specifying the sign up session.

14. The client computer of claim 9, wherein the authentication request message and the authentication response message are formatted in a Security Assertion Markup Language (SAML).

15. The client computer of claim 9, wherein the processor is further caused to:

receiving, by the client computer, a first redirect message identifying the cloud infrastructure console;

forwarding the first redirect message to the cloud infrastructure console;

responsive to receiving the first redirect message from the cloud infrastructure console, storing a key pair included in the first redirect message at an indexed database; and responsive to receiving the security token and the identity token from the sign on portal, storing the security token and the identity token at the indexed database.

16. A non-transitory computer-readable medium including stored thereon a sequence of instructions that, when executed by one or more processors of a client computer causes the one or more processors to execute the sequence of instructions to perform operations comprising:

obtaining, by a client computer, a sign-up request, the sign-up request for requesting to sign up a new account to a cloud infrastructure console;

receiving, from a sign on portal, an authentication request message;

forwarding, by the client computer, the authentication request message to authenticate the new account using data included in the sign-up request;

receiving, by the client computer, an authentication response message indicating the authentication of the new account;

forwarding, by the client computer, the authentication response message to the sign on portal;

receiving, from the sign on portal, a security token and an identity token;

providing, by the client computer, the security token and the identity token to the cloud infrastructure console;

receiving, by the client computer, a Secure Password Authentication (SPA) message from the cloud infrastructure console; and accessing, by the client computer, a secure page at the cloud infrastructure console based at least in part on the SPA message.

17. The non-transitory computer-readable medium of claim 16, wherein a client web browser is configured to obtain a cookie from the cloud identity provider portal computer with a server side session ID to maintain a server side session with the cloud identity provider portal computer during authentication of the new account.

18. The non-transitory computer-readable medium of claim 17, wherein the client web browser is configured to send the cookie to the cloud identity provider portal computer when the authentication request message is forwarded to the cloud identity provider portal computer, wherein the cloud identity provider portal computer is configured to identify a sign up session with the client web browser using the cookie identifying a session ID specifying the sign up session.

19. The non-transitory computer-readable medium of claim 16, wherein the authentication request message and the authentication response message are formatted in a Security Assertion Markup Language (SAML).

20. The non-transitory computer-readable medium of claim 16, wherein the process further includes:

receiving, from a cloud identity provider portal computer, a first redirect message identifying the cloud infrastructure console;

forwarding the first redirect message to the cloud infrastructure console;

responsive to receiving the first redirect message from the cloud infrastructure console, storing a key pair included in the first redirect message at an indexed database; and responsive to receiving the security token and the identity token from the sign on portal, storing the security token and the identity token at the indexed database.

* * * * *